I. W. MEAD.
Vehicle Wheel.
No. 197,155. Patented Nov. 13, 1877.
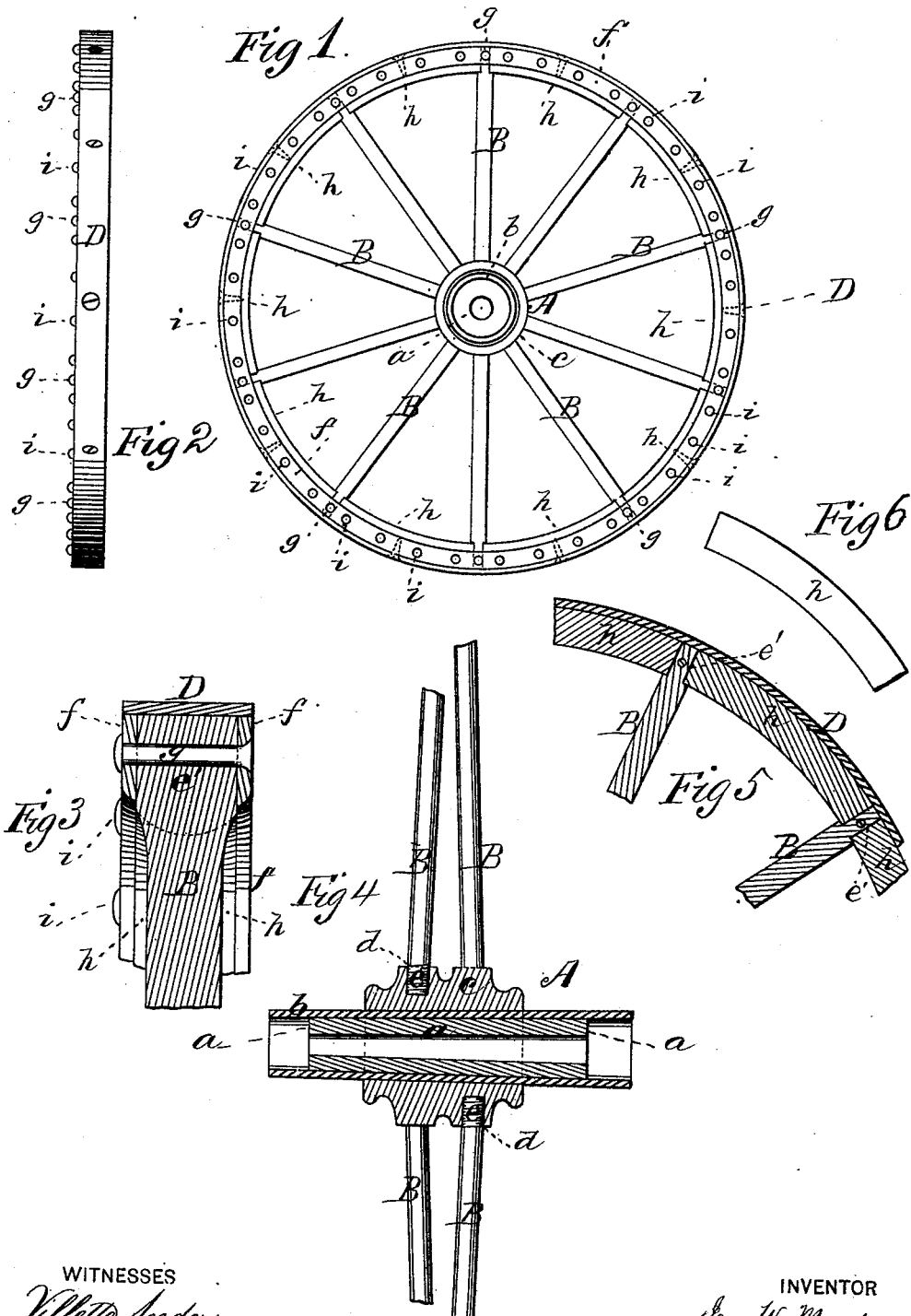

UNITED STATES PATENT OFFICE.

IRA W. MEAD, OF FALLS VILLAGE, ASSIGNOR OF ONE-HALF HIS RIGHT TO LYMAN MUNSON, OF CANAAN, CONNECTICUT.

IMPROVEMENT IN VEHICLE-WHEELS.

Specification forming part of Letters Patent No. 197,155, dated November 13, 1877; application filed September 29, 1877.

*To all whom it may concern:*

Be it known that I, IRA W. MEAD, of Falls Village, in the county of Litchfield and State of Connecticut, have invented a new and valuable Improvement in Iron Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved wheel. Fig. 2 is an edge view, Figs. 3, 4, and 5 are detail sectional views, and Fig. 6 is a detail view, of the felly.

This invention has relation to improvement in iron wheels for vehicles.

The nature of my invention will be fully described in the following description, and set forth in the claims.

In the annexed drawings, the letter A designates the hub of my improved wheel, consisting of a steel box, $a$, which receives the spindle of the axle, and sustains the wear incident upon the revolution of the wheel; a metallic tube, $b$, that is passed over the said box, and rigidly secured thereto, by shrinking on or otherwise, with its ends extending out beyond the said box; and an exterior metallic annulus, $c$, that is shrunk on the tube $b$, and forms the central part or body of the hub. The annulus $c$ is sufficiently thick to afford seats $d$ for the spokes B. These seats are female screw threaded, and are arranged in two parallel rows, at a suitable distance apart, the seats in one row alternating with those in the other, so that while the said spokes are spaced at the hub they converge at the rim, thus giving the said spokes a broad bearing on the hub, and bracing the wheel against lateral strain. The feet of the spokes are screw-threaded, as shown at $e\ e$, Fig. 4, while their outer ends are tenoned, as shown at $e'\ e'$. The spokes being all screwed into the hub, and the tenons properly made, metallic edge rings $f$ are riveted or bolted to the tenons at each side thereof, as shown in Figs. 1 and 3, at $g$. A space is thus formed between adjoining tenons and the edge rings $f$, in which is inserted a wooden felly, $h$, the perimeter of which is flush with the outer convex face of the said rings. The spaces between all the spoke-tenons being supplied each with a felly, $h$, the edge rings $f$ are clamped together by means of rivets $i$ against the fellies, thereby effectually guarding against all lateral displacement of the said rings. This being accomplished, the tire D is applied in the usual manner to the perimeter of the wheel and edge rings, as shown in Fig. 3, and the wheel is complete.

The fellies $h$ prevent the side rings $f$ from spreading, and at the same time greatly increase their rigidity. They do not, however, prevent either the tire or the rings from contracting or expanding under variations of temperature. All the remaining parts are made of metals which expand or contract, to all intents and purposes, equally, and the spokes, being once tight, must remain fixed as long as the materials of the wheel last; and the tire cannot run off, for the reason that it and the edge rings expand and contract equally.

Having thus described my invention, what I claim as new, and desire to secure by Letters Patent, is—

1. In a metallic wheel, the hub A, consisting of the steel axle-box $a$, the metallic tube $b$, shrunk thereon, with its ends projecting at each end beyond the said box, and the metallic annulus $c$, shrunk upon the central portion of the said tube, and provided with spaced alternating threaded spoke-sockets $d$, as and for the purpose specified.

2. In an iron wheel, the hub A, composed of steel axle-box $a$, and the metallic tube $b$, and annulus $c$, in combination with the spokes B, screwed into said hub, the edge rings $f$, the fellies $h$, and the tire D, shrunk on with its edges bearing upon the said rings, substantially as specified.

In testimony that I claim the above I have hereunto subscribed my name in the presence of two witnesses.

IRA W. MEAD.

Witnesses:
MARVIN A. DEAN,
LYMAN MUNSON.